US010831572B2

(12) United States Patent
 Hall

(10) Patent No.: US 10,831,572 B2
(45) Date of Patent: Nov. 10, 2020

(54) PARTITION AND ACCESS SWITCHING IN DISTRIBUTED STORAGE SYSTEMS

(71) Applicant: AT&T Intellectual Property I, L.P., Atlanta, GA (US)

(72) Inventor: Robert J. Hall, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 43 days.

(21) Appl. No.: 16/184,890

(22) Filed: Nov. 8, 2018

(65) Prior Publication Data

US 2020/0151035 A1 May 14, 2020

(51) Int. Cl.
 *G06F 9/54* (2006.01)
 *G06F 3/06* (2006.01)

(52) U.S. Cl.
 CPC ............ *G06F 9/546* (2013.01); *G06F 3/0613* (2013.01); *G06F 3/0646* (2013.01); *G06F 3/0683* (2013.01)

(58) Field of Classification Search
 CPC ...................................................... G06F 9/546
 USPC ........................................................ 719/313
 See application file for complete search history.

(56) References Cited

U.S. PATENT DOCUMENTS

| 8,972,601 | B2 | 3/2015 | Padhye et al. |
| 8,996,683 | B2 * | 3/2015 | Maltz ................ H04L 29/12028 709/224 |
| 9,237,072 | B2 | 1/2016 | Anantharam et al. |
| 9,306,840 | B2 | 4/2016 | Puttaswamy Naga et al. |
| 9,367,253 | B2 | 6/2016 | Gough et al. |
| 9,606,896 | B2 | 3/2017 | Mehta et al. |
| 9,661,405 | B2 * | 5/2017 | Mehrvar ............... H04L 49/356 |
| 9,705,798 | B1 * | 7/2017 | Abts ..................... H04L 47/122 |
| 9,742,586 | B2 | 8/2017 | Yang et al. |
| 9,819,573 | B2 | 11/2017 | Fang et al. |
| 9,826,030 | B1 | 11/2017 | Dhoolam et al. |
| 9,929,960 | B1 | 3/2018 | Abts et al. |
| 9,936,268 | B2 | 4/2018 | Vendrow et al. |
| 2015/0222705 | A1 | 8/2015 | Stephens |

OTHER PUBLICATIONS

"Scale-Out Networking in the Data Center", Amin Vandat et al. Published by IEEE Computer Society, Jul./Aug. 2010. pp. 1-13.

* cited by examiner

*Primary Examiner* — Andy Ho

(57) ABSTRACT

Devices, computer-readable media, and methods for reducing the number of "hops" that internal messages must traverse in data center switching architectures are disclosed. In one example, a data center includes a first rack housing a first server, a first computational process associated to a first storage drive hosted on the first server and residing within a first level of the distributed storage system, a second rack housing a second server, a second computational process associated to a second storage drive hosted on the second server and residing within the first level of the distributed storage system, and a first switch communicatively coupled to the first level to receive messages directly from the first computational process and the second computational process.

20 Claims, 3 Drawing Sheets

PARTITION AND ACCESS SWITCHING IN DISTRIBUTED STORAGE SYSTEMS

The present disclosure relates generally to distributed storage systems, and relates more particularly to methods, computer-readable media, and devices for reducing the number of "hops" that internal messages must traverse in data center switching architectures.

BACKGROUND

When a data object is stored in a large-scale distributed storage system (or "data center"), the object may be split into a plurality of shares, and the plurality of shares may be stored on a plurality of different storage drives within the distributed storage system. Subsequently, the object may be reconstructed from the shares as long as no more than a maximum number of the shares is lost. For instance, an object that is split into four primary shares and two supplemental shares (where the size of each share is the size of the object divided by the number of primary shares) may be reconstructed without loss even if up to two shares are lost. This is known as "erasure coding."

Alternatively or in addition, a data object and/or its shares may be copied to produce a plurality of replicas. The plurality of replicas may be stored on a plurality of different storage drives. Subsequently, the object may be retrieved as long as at least one replica of the object (or at least one replica corresponding to each share of the object) has not been lost.

SUMMARY

Devices, computer-readable media, and methods for reducing the number of "hops" that internal messages must traverse in data center switching architectures are disclosed. In one example, a data center includes a first rack housing a first server, a first computational process associated to a first storage drive hosted on the first server and residing within a first level of the distributed storage system, a second rack housing a second server, a second computational process associated to a second storage drive hosted on the second server and residing within the first level of the distributed storage system, and a first switch communicatively coupled to the first level to receive messages directly from the first computational process and the second computational process.

In another example, a method includes receiving, by a first switch in a data center, a message directly from a first computational process associated to a first storage drive hosted on a first server in the data center, and forwarding, by the first switch, the message directly to a second computational process associated to a second storage drive hosted on a second server in the data center.

In another example, a non-transitory computer-readable medium stores instructions which, when executed by a first switch of a data center including a first processor, cause the first processor to perform operations. The operations include receiving a message directly from a first computational process associated to a first storage drive hosted on a first server in the data center, and forwarding the message directly to a second computational process associated to a second storage drive hosted on a second server in the data center.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
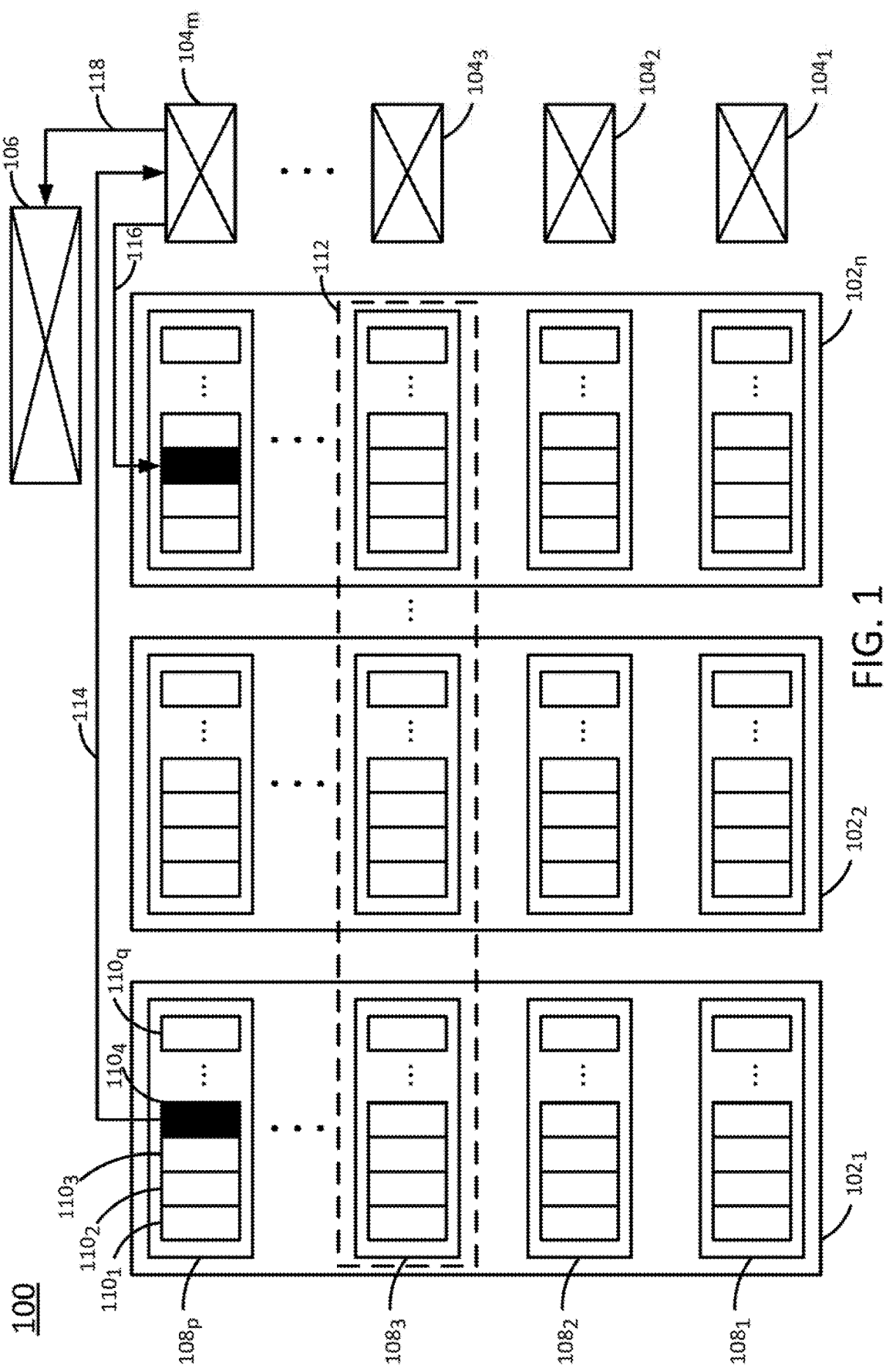
FIG. 1 illustrates an example distributed storage system in which examples of the present disclosure for reducing the number of hops that internal messages must traverse may operate.

In one example, the present disclosure describes a method, computer-readable medium, and device for reducing the number of "hops" that internal messages must traverse in data center switching architectures. As discussed above, when a data object is stored in a large-scale distributed storage system (or "data center"), the object may be split into a plurality of shares, and the plurality of shares may be stored on a plurality of different storage drives within the distributed storage system. Alternatively or in addition, the data object and/or its shares may also be copied to produce a plurality of replicas, and the plurality of replicas may be stored on a plurality of different storage drives.

In some architectures, a storage drive is managed (e.g., operated, configured, and/or used) by a computational process associated to the storage drive. For instance, in the CEPH open source distributed storage system, each storage drive is managed by a process known as an Object Storage Daemon (OSD). In such a storage system, messages are exchanged between OSDs in order to perform data redundancy operations such as creating, storing, and retrieving shares or replicas. The OSD, in turn, actually performs operations to the storage drive itself, such as writing or reading data to/from the storage drive. It should be noted that many variations on the concept of a storage drive being managed by an associated computational process are possible, including having the computational process reside on a server or host to which the storage drive is attached, having the computational process reside within a processing element within the storage drive itself, or having the computational process reside at a remote processing element not directly attached to the storage drive itself. All of these variations are considered by the present disclosure and included as examples.

When the data object or its shares are needed for a data operation, internal data messages are employed to get the data object or its shares to where they need to be. In a data center switching architecture, these internal data messages may traverse four or more network hops. As the number of network hops traversed by the internal data messages increases, the latency of the messages may also increase in response to the increase in network traffic. In addition, the high-bandwidth interconnect links that may be needed to transport these internal data messages may be very costly.

Examples of the present disclosure reduce the network "distance," and therefore the number of hops, which exists between components of a distributed storage system. For example, by reducing the number of network hops traversed by internal data messages to less than four (and, in some cases to as few as two), the latency experienced by most internal messages in the distributed storage system can be reduced. In addition, high-bandwidth interconnect links can be replaced with lower-bandwidth (and therefore lower cost) links. Thus, the performance of the distributed storage system can be greatly improved, while the hardware costs can be reduced.

In one example, a distributed storage system according to the present disclosure utilizes a partition switch to which the storage drives and associated computational processes of a corresponding storage partition may be directly connected (e.g., by one hop). Thus, when storage drives and associated computational processes within the same partition cooperate to process an object, data messages may be exchanged between those storage drives and associated computational processes in a maximum of two hops (e.g., one hop from the first storage drive's associated computational process to the partition switch, and one hop from the partition switch to the second storage drive's associated computational process). An access switch may still be employed to couple the partition to the external switch fabric and to the partition switches of other partitions. Thus, data messages that are entirely internal to the distributed storage system may traverse as few as two hops, versus the four or more hops traversed in some distributed storage systems. These and other aspects of the present disclosure are described in greater detail below in connection with the examples of FIGS. 1-3.

Within the context of the present disclosure, a "partition" generally refers to a group of n storage drives whose hosts/servers all reside on a common level of a distributed storage system. In one example, no two drives of the n storage drives reside within the same host or server. In another example, however, all n storage drives may reside within the same host or server. Examples of the present disclosure are not limited by the manner in which the storage drives of a partition are distributed across hosts/servers.

Within the context of the present disclosure, the term "storage drive" is used to denote any device that is capable of storing data for subsequent retrieval. This includes magnetic disk drives, solid state drives implemented using flash technology, non-volatile random access memory (NVRAM) storage devices, random access memory (RAM) based devices, or allocated portions of any of the above devices (e.g., where a portion refers to a subset of the storage capacity within a larger storage drive device). Moreover, within the context of the present disclosure, it should be understood that any reference to a "storage drive" can include the storage drive itself, as well as the storage drive's associated computational processes. Furthermore, any references to a message being sent "from a storage drive" or "to a storage drive" are intended to indicate, in shorthand, that the messages are sent "from the computational process associated to a storage drive" or "to the computational process associated to a storage drive."

Moreover, although examples of the disclosure are discussed within the context of distributed storage systems, the examples disclosed herein may apply equally to data centers applications other than distributed storage, including applications to accelerate computing (e.g., data analytics, machine learning, video and image processing, and the like) and applications to facilitate network acceleration (e.g., compression and/or decompression, deep packet inspection, etc.).

To further aid in understanding the present disclosure, FIG. 1 illustrates an example distributed storage system 100 in which examples of the present disclosure for reducing the number of hops that internal messages must traverse may operate. The distributed storage system 100 of FIG. 1 may represent a portion of an overall system/network comprising co-located equipment residing within a same datacenter.

In accordance with the present disclosure, the distributed storage system 100 may comprise a packet network, e.g., an IP network, broadly defined as a network that uses Internet Protocol to exchange data packets. Additional example IP networks include Voice over IP (VoIP) networks, Service over IP (SoIP) networks, and the like. In one example, the distributed storage system 100 may comprise a core network of a telecommunications service provider. In one example, the distributed storage system 100 may combine core network components of a cellular network with components of a triple play service network; where triple-play services include telephone services, Internet or data services and television services to subscribers. For example, a core network may functionally comprise a fixed mobile convergence (FMC) network, e.g., an IP Multimedia Subsystem (IMS) network. In addition, the distributed storage system 100 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The distributed storage system 100 may further comprise a broadcast television network, e.g., a traditional cable provider network or an Internet Protocol Television (IPTV) network, an Internet Service Provider (ISP) network, as well as a software-defined networking (SDN). In one example, the distributed storage system 100 may include a plurality of television (TV) servers (e.g., a broadcast server, a cable head-end), a plurality of content servers, an advertising server (AS), an interactive TV/video on demand (VoD) server, and so forth. In all of these examples, the above-described components may be represented by servers and other non-illustrated components (e.g., additional nodes, servers, and so forth) in racks, other data centers, and so on, as discussed below.

In one example, the distributed storage system 100 may comprise a plurality of racks $102_1$-$102_n$ (hereinafter individually referred to as a "rack 102" or collectively referred to as "racks 102"). Taking the rack $102_1$ as an example (where the remaining racks 102 may be similarly configured), each rack 102 may house one or more servers $108_1$-$108_p$ (hereinafter individually referred to as a "server 108" or collectively referred to as "servers 108"). A "level" within the context of the present disclosure may comprise one server 108 from each of the racks 102. FIG. 1 illustrates one such level 112. In one example, there may be as many levels within the distributed storage system 100 as there are servers 108 within each rack 102 (or within the rack 102 housing the greatest number of servers 108).

The racks 102 need not house an equal number of servers 108. For instance, the racks $102_1$, $102_2$, and $102_n$ could each house a different number of servers 108.

In addition, taking the server $108_p$ as an example (where the remaining servers 108 may be similarly configured), each server 108 may host one or more storage drives $110_1$-$110_q$ (hereinafter individually referred to as a "storage drive 110" or collectively referred to as "storage drives 110"). The storage drives 110 may comprise, for example, disk drives or any other type of storage drive technology. As discussed above, a group of storage drives 110 residing on a common level of the distributed storage system 100

(whether residing across different servers 108 or on a common server 108) may be referred to as a "partition." The servers 108 need not host an equal number of storage drives 110. For instance, the servers $108_1$, $108_2$, $108_3$, and $108_p$ could each host a different number of storage drives 110. Each of the storage drives 110, in turn, may store one or more data objects, shares of data objects, or replicas of data objects. In other examples, the servers 108 may host applications, containers, virtual machines (VMs), or the like.

The distributed storage system 100 may further comprise a plurality of switches. In one example, the plurality of switches includes a plurality of partition switches $104_1$-$104_m$ (hereinafter individually referred to as a "partition switch 104" or collectively referred to as "partition switches 104"). Each partition switch 104 may be communicatively coupled to a respective level within the racks 102. As such, any partition, or set of storage drives 110, within the corresponding level may communicate directly with the partition switch 104. In other words, the partition switch 104 for a given level resides one hop away from each partition within the given level. This is shown, for example, by the storage drives 110 of the server $108_p$ communicating directly with the partition switch $104_m$ (as indicated by the arrow 114). In further examples, some levels may be communicatively coupled to more than one partition switch 104 to increase reliability. In addition, some partition switches 104 may be communicatively coupled to more than one level (e.g., providing that the partition switches 104 include additional ports to accommodate connections to the additional levels). In this case, two or more partitions residing on different levels may be communicatively coupled to the same partition switch 104.

In addition, the plurality of switches may further include an access switch 106. In one example, each of the partition switches 104 is communicatively coupled directly to the access switch 106. The access switch may also connect the distributed storage system 100 to the external switch fabric, which may include an external computing device or system (e.g., another distributed storage system for instance), an underlay network (comprising, e.g., gateways, spines, leafs, and/or the like), or other means for interconnecting the plurality of racks 102.

In operation, when a first storage drive (potentially in a first partition) needs to communicate with a second storage drive (potentially in a second partition) residing in the same level, but on a different server/rack, the first storage drive may send a message to the partition switch corresponding to the level. An example is shown in FIG. 1 by the arrow 114, and constitutes a first hop for the message. Subsequently, the partition switch may forward the message to the second storage drive. An example is shown in FIG. 1 by the arrow 116, and constitutes a second hop for the message. Thus, the message may travel a path from the first storage drive to the second storage drive in as few as two hops total.

Thus, the distributed storage system 100 illustrated in FIG. 1 represents an improvement over some distributed storage systems, in which each rack may include a dedicated switch (e.g., a "top of the rack" or "TOR" switch) connecting all servers within the rack and through which all communications involving data objects stored in the rack might pass. For instance, if a first storage drive residing in a first rack and level of such a distributed storage system needed to send a message to a second partition in a second storage drive but the same level, the message would first travel from the first storage drive to the dedicated switch for the first rack (e.g., constituting a first hop). Next, the message might travel from the dedicated switch for the first rack to a global switch connecting all of the racks in the distributed storage system (e.g., constituting a second hop). The message might then travel from the global switch to a dedicated switch for the second rack (e.g., constituting a third hop). Finally, the message might travel from the dedicated switch for the second rack to the second storage drive (e.g., constituting a fourth hop).

As noted above, the partition switches 104 of FIG. 1 are also communicatively coupled to the access switch 106. This allows the devices within the distributed storage system to communicate with devices and systems that are external to the distributed storage system 100, though, unlike intra-partition or intra-level communications, communications that travel beyond the distributed storage system 100 may travel over more than two hops. For instance, when a first storage drive needs to communicate with a device or system that is external to the distributed storage system 100, the first storage drive may send a message to the partition switch corresponding to the level in which the first storage drive resides. An example is shown in FIG. 1 by the arrow 114, and constitutes a first hop for the message. Subsequently, the partition switch may forward the message to the access switch 106. An example is shown in FIG. 1 by the arrow 118, and constitutes a second hop for the message. From there, the message may travel over a variable number of hops (and via a variable number of switches) to reach the device or system that is external to the distributed storage system 100.

It should be noted that the distributed storage system 100 has been simplified. Thus, the system 100 may be implemented in a different form than that which is illustrated in FIG. 1, or may be expanded by including other components, including additional racks, servers, and storage drives, without altering the scope of the present disclosure. In addition, distributed storage system 100 may be altered to omit various elements, substitute elements for devices that perform the same or similar functions, combine elements that are illustrated as separate devices, and/or implement network elements as functions that are spread across several devices that operate collectively as the respective network elements. For example, the distributed storage system 100 may include other components (not shown) such as controllers, hypervisors, virtual machines (VMs), underlay networks, and the like. Thus, these and other modifications are all contemplated within the scope of the present disclosure.

Figure 3:
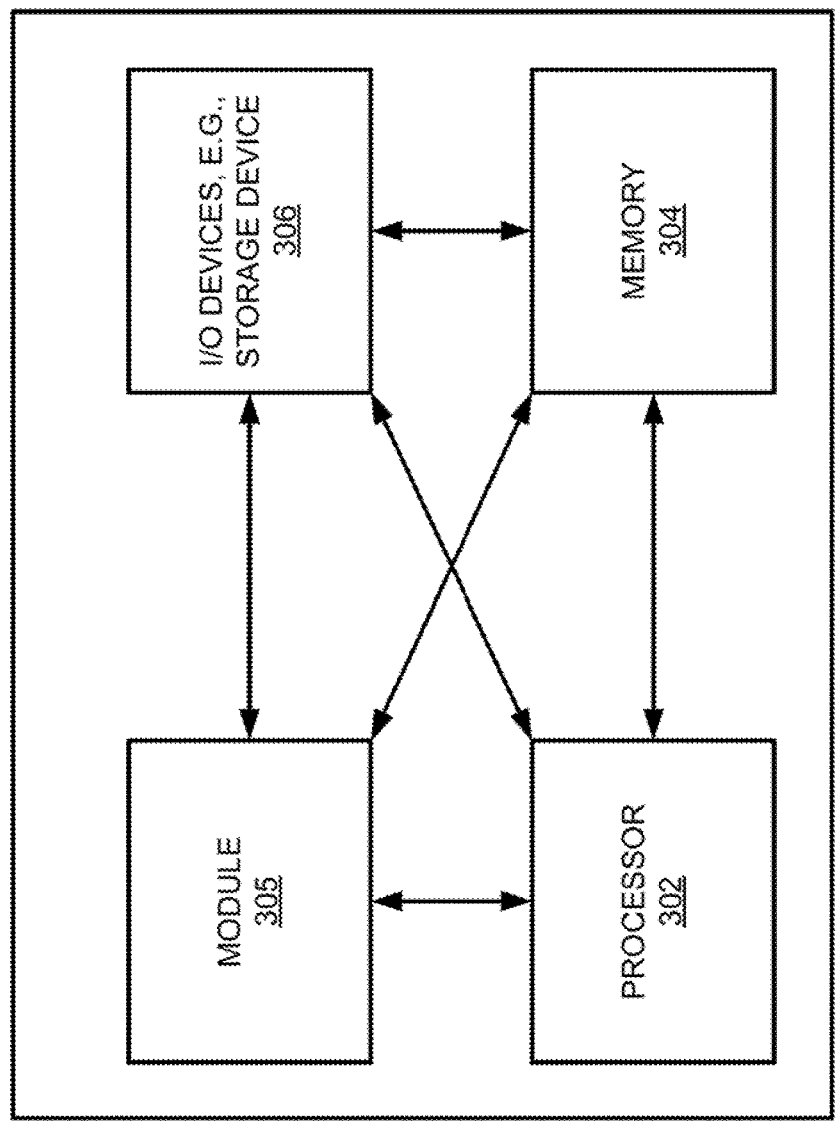
FIG. 3 depicts a high-level block diagram of a computing device or processing system specifically programmed to perform the functions described herein.

Furthermore, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Figure 2:
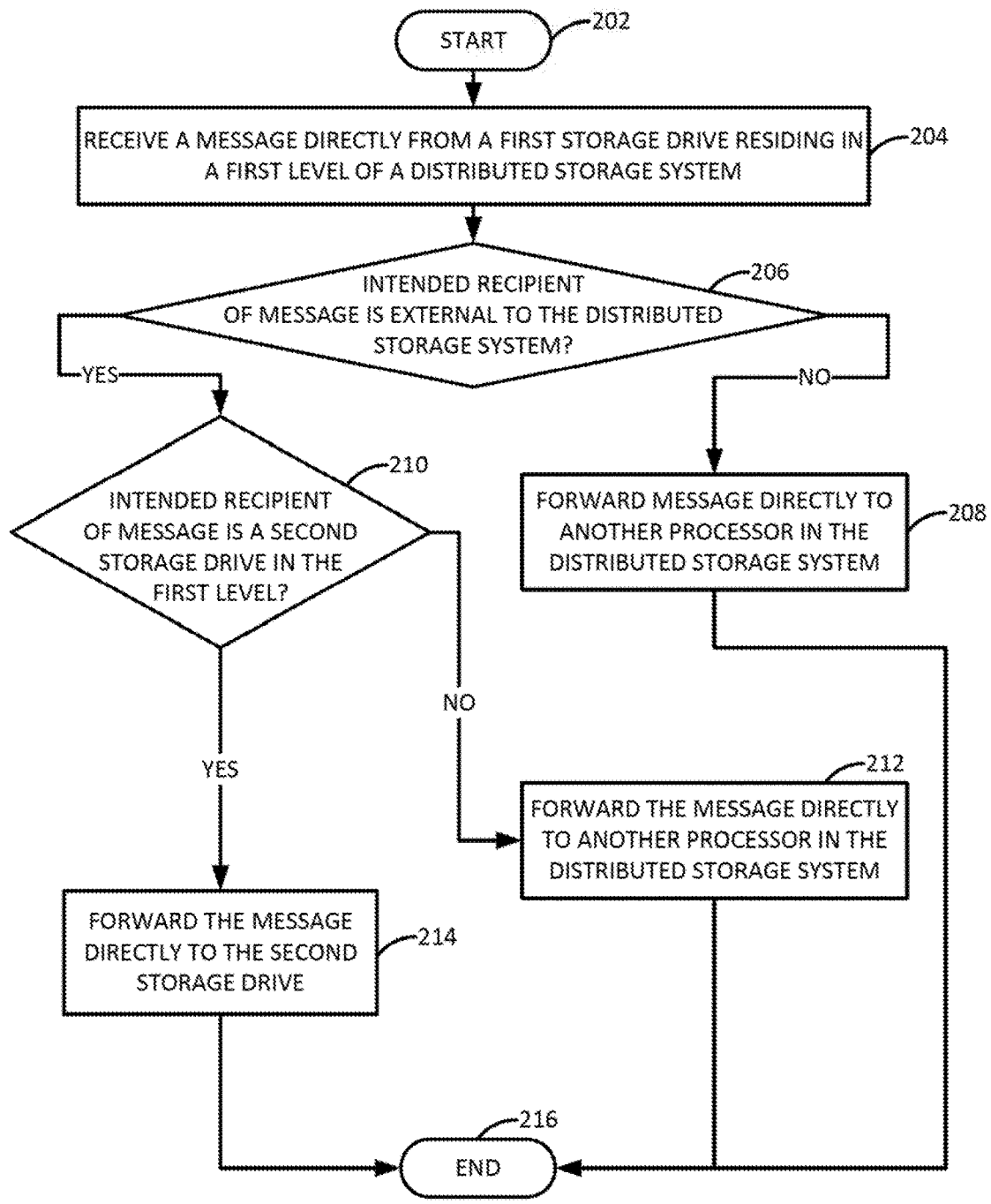
FIG. 2 illustrates an example method in accordance with examples of the present disclosure for managing communications within a distributed storage system.

FIG. 2 illustrates an example method 200 in accordance with examples of the present disclosure for managing communications within a distributed storage system. The steps, functions, or operations of the method 200 may be performed, for example, by any of the partition switches 104 illustrated in FIG. 1. In another example, the steps, functions, or operations of method 200 may be performed by a computing device or system 300, and/or processor 302 as described in connection with FIG. 3 below. For instance, the computing device or system 300 may represent any one or more components of a partition switch, such as a partition switch 104 in FIG. 1 that is configured to perform the steps, functions, and/or operations of the method 200. Similarly, in one example, the steps, functions, and/or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processor, such as processor 302.

The method 200 begins in step 202 and proceeds to step 204.

In step 204, the processor may receive a message directly from a first storage drive within a distributed storage system comprising a plurality of racks (wherein each of the plurality of racks may in turn comprise a plurality of servers housing a plurality of storage drives grouped into a plurality of partitions). In one example, the message travels in a single hop from the first storage drive to the processor; that is, the message is not forwarded by an intermediary residing between the first storage drive and the processor. As discussed above, the first storage drive may reside within a first partition within the distributed storage system, where the first partition comprises a plurality of storage drives. In addition, all of the storage drives within the first partition may reside on a first "level" of the distributed storage system. The processor in this case may be part of a first partition switch that manages communications for all partitions in the first level.

In step 206, the processor may determine whether the intended recipient of the message is internal to the distributed storage system. For instance, the message may be intended for another storage drive in the distributed storage system. Alternatively, the message may be intended for another device or system that is external to the distributed storage system.

If the processor determines in step 206 that the intended recipient of the message is not internal to the distributed storage system, then the processor may proceed to step 208. In step 208, the processor may forward the message directly to another processor in the distributed storage system. In this case, the other processor may be part of an access switch for the distributed storage system, where the access switch may connect all of the racks within the distributed storage system and also may connect the distributed storage system to an external switch fabric. As discussed above, the external switch fabric may include an external computing device or system (e.g., another distributed storage system for instance), an underlay network (comprising, e.g., gateways, spines, leafs, and/or the like), or other means for interconnecting the plurality of racks within the distributed storage system. Once the message has been forwarded to the other processor, the method 200 may end in step 216.

Alternatively, if the processor determines in step 206 that the intended recipient of the message is internal to the distributed storage system, then the processor may proceed to step 210. In step 210, the processor may determine whether the intended recipient of the message is a storage drive (e.g., a second storage drive) residing within the same level (e.g., the first level) of the distributed storage system as the first storage drive.

If the processor determines in step 210 that the intended recipient of the message is not a storage drive within the same level of the distributed storage system as the first storage drive, then the processor may proceed to step 212. In step 212, the processor may forward the message to another processor in the distributed storage system. In this case, the other processor may be part of an access switch for the distributed storage system. Alternatively, the other processor may be part of a partition switch (e.g., a second partition switch, different from the first partition switch) that manages communications for all storage drives in a level of the distributed storage system other than the first level. This level may, for instance, be a second level that includes the second storage drive. Once the message has been forwarded to the other processor, the method 200 may end in step 216.

Alternatively, if the processor determines in step 210 that the intended recipient of the message is a storage drive within the same level of the distributed storage system as the first storage drive (e.g., within the first level), then the processor may proceed to step 214. In step 214, the processor may forward the message directly to the intended recipient (e.g., the second storage drive residing in the first level). Once the message has been forwarded directly to the intended recipient, the method 200 may end in step 216.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a storage drive, an optical drive, a magnetic drive, and/or a Universal Serial Bus (USB) drive), a module 305 for managing communications within a distributed storage system, and various input/output devices 306, e.g., a camera, a video camera, storage devices, including but not limited to, a tape drive, a floppy drive, a hard storage drive or a compact storage drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for managing communications within a distributed storage system (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for managing communications within a distributed storage system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A data center comprising:
a first rack housing a first server;
a first computational process associated to a first storage drive hosted on the first server and residing within a first level of a distributed storage system;
a second rack housing a second server;
a second computational process associated to a second storage drive hosted on the second server and residing within the first level of the distributed storage system; and
a first switch communicatively coupled to the first level to receive first messages directly from the first computational process, the second computational process, and at least a third computation process associated to a third storage drive hosted on a third server and residing within the first level of the distributed storage system.

2. The data center of claim 1, further comprising:
a second switch communicatively coupled to the first switch and to a switch fabric that is external to the data center.

3. The data center of claim 1, wherein the data center is configured as the distributed storage system, and the first storage drive and the second storage drive are each configured to store data objects.

4. The data center of claim 1, wherein the first switch resides one hop away from the first server and from the second server in the distributed storage system.

5. The data center of claim 1, wherein the first storage drive and the second storage drive reside within a common partition of the data center.

6. The data center of claim 1, further comprising:
a second switch communicatively coupled to the first level to receive second messages directly from the first computational process and the second computational process.

7. The data center of claim 1, wherein the first switch is communicatively coupled to a second level comprising a fourth storage drive.

8. The data center of claim 7, wherein the fourth storage drive is hosted on the first server.

9. A method comprising:
receiving, by a first switch in a data center, a first message directly from a first computational process associated to a first storage drive hosted on a first server in the data center and residing within a first level of a distributed storage system; and
forwarding, by the first switch, the first message directly to a second computational process associated to a second storage drive hosted on a second server in the data center and residing within the first level of a distributed storage system, wherein the first switch is communicatively coupled to the first level to receive a plurality of messages including the first message directly from the first computational process, the second computational process, and at least a third computation process associated to a third storage drive hosted on a third server and residing within the first level of the distributed storage system.

10. The method of claim 9, wherein the receiving occurs over a first hop in a network, and the forwarding occurs over a second hop in the network, such that a path traveled by the first message from the first computational process to the second computational process includes a maximum of two hops.

11. The method of claim 9, wherein the first level includes the first switch and a second switch.

12. The method of claim 9, further comprising:
receiving, by the first switch, a second message directly from the first computational process; and
forwarding, by the first switch, the second message to a second switch in the data center, when an intended recipient of the second message does not reside in the first level in which the first storage drive resides.

13. The method of claim 12, wherein the intended recipient of the second message resides outside of the data center, and the second switch communicatively couples the data center to a switch fabric that is external to the data center.

14. The method of claim 12, wherein the intended recipient is a fourth computational process associated to a fourth storage drive residing in a level of the data center other than the first level in which the first storage drive resides, and the second switch communicatively couples a plurality of switches including the first switch.

15. A non-transitory computer-readable medium storing instructions which, when executed by a first switch of a data center including a first processor, cause the first processor to perform operations, the operations comprising:
receiving a first message directly from a first computational process associated to a first storage drive hosted on a first server in the data center and residing within a first level of a distributed storage system; and
forwarding the first message directly to a second computational process associated to a second storage drive hosted on a second server in the data center and residing within the first level of a distributed storage system, wherein the first switch is communicatively coupled to the first level to receive a plurality of messages including the first message directly from the first computational process, the second computational process, and at least a third computation process associated to a third storage drive hosted on a third server and residing within the first level of the distributed storage system.

16. The non-transitory computer-readable medium of claim 15, wherein the receiving occurs over a first hop in a network, and the forwarding occurs over a second hop in the network, such that a path traveled by the first message from the first computational process to the second computational process includes a maximum of two hops.

17. The non-transitory computer-readable medium of claim 15, wherein the first level includes the first switch and a second switch.

18. The non-transitory computer-readable medium of claim 15, the operations further comprising:
receiving a second message directly from the first computational process; and
forwarding the second message to a second switch including a second processor in the data center, when an intended recipient of the second message does not reside in the first level in which the first storage drive resides.

19. The non-transitory computer-readable medium of claim 18, wherein the intended recipient of the second message resides outside of the data center, and the second processor communicatively couples the data center to a switch fabric that is external to the data center.

20. The non-transitory computer-readable medium of claim 18, wherein the intended recipient is a fourth computational process associated to a fourth storage device residing in a level of the data center other than the first level in which the first storage drive resides, and the second processor communicatively couples a plurality of processors including the first processor.

* * * * *